D. M. SMITH.
WHIFFLETREE AND COUPLING THEREFOR.
APPLICATION FILED OCT. 26, 1910.
1,066,441.
Patented July 1, 1913.
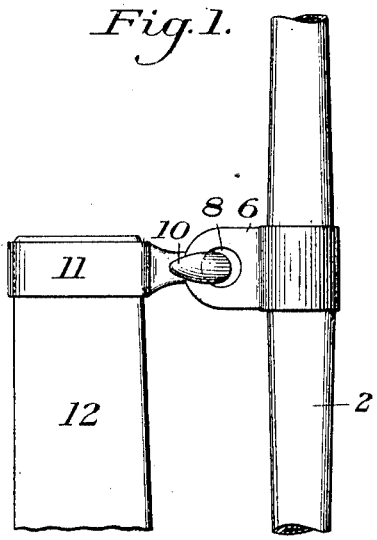
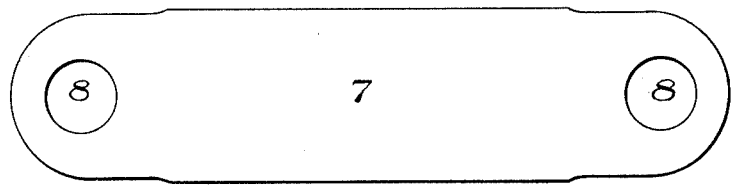
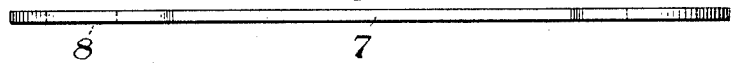
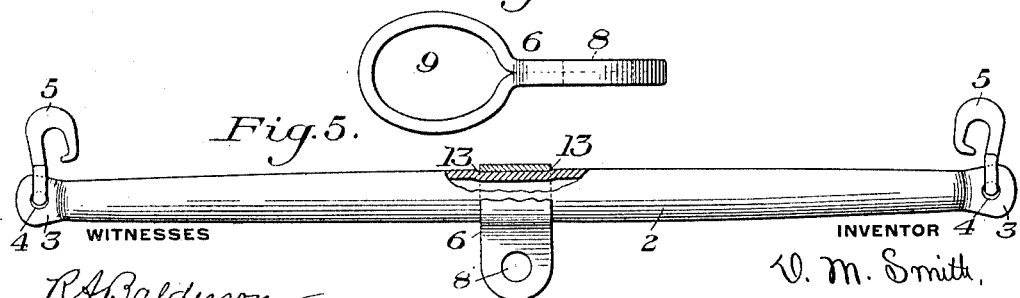

UNITED STATES PATENT OFFICE.

DAVID M. SMITH, OF SEWICKLEY, PENNSYLVANIA, ASSIGNOR TO DIAMOND FORGING & MANUFACTURING COMPANY, OF PITTSBURGH, PENNSYLVANIA, A CORPORATION OF PENNSYLVANIA.

WHIFFLETREE AND COUPLING THEREFOR.

1,066,441. Specification of Letters Patent. Patented July 1, 1913.

Application filed October 26, 1910. Serial No. 589,195.

*To all whom it may concern:*

Be it known that I, DAVID M. SMITH, of Sewickley, Allegheny county, Pennsylvania, have invented a new and useful Whiffletree and Coupling Therefor, of which the following is a full, clear, and exact description, reference being had to the accompanying drawings, forming part of this specification, in which—

Figure 1 is a plan view of a portion of a whiffletree coupled to an evener bar; Figs. 2 and 3 are respectively plan and edge views of the coupling blank; Fig. 4 is a side view of the finished coupling; and Fig. 5 is a plan view, partly in section of the complete whiffletree and coupling.

My invention has relation to whiffletrees and couplings therefor, and is designed to provide a whiffletree and coupling which can be manufactured at a low cost, and which is strong and durable.

Referring to the accompanying drawings, the numeral 2 designates a whiffletree, which is preferably formed of a piece of hollow or tubular metal. For this purpose, I merely use a piece of metal pipe, drawing its ends down somewhat, and flattening them as shown at 3. These flattened ends are perforated, as at 4, to receive the usual whiffletree hooks 5.

6 designates my improved coupling, which is formed from a blank 7 (Figs. 2 and 3) by forging and welding. The end portions of the blank are provided with the perforations 8, the blank being forged or stamped and punched to this form. It is then bent upon itself, to cause its central portion to form the eye 9, and its end portions are brought together and welded, with the perforations in alinement, these perforations forming the hole to receive the hook 10 of the ferrule 11 on the evener bar 12.

In bending the blank to form the eye 9, any suitable mandrel or former may be employed, but I prefer to use the whiffletree 2 as such mandrel and to form the eye of the coupling directly around and upon the whiffletree, as shown in Fig. 5, since in this way not only can the coupling be accurately fitted to the whiffletree, but the forging operation, together with the shrinkage of the hot metal, will cause the coupler to indent itself somewhat into the whiffletree, as shown at 13 and thus firmly secure it in place.

Where the coupling is formed over a separate mandrel, it can be driven or otherwise forced to its seat upon the whiffletree.

Whiffletrees and couplings in accordance with my invention can be rapidly and cheaply made, and are of very desirable and durable character and construction.

What I claim is:—

The combination with a hollow metal draft member, of a coupling consisting of a strap having an opening therethrough, which is smaller than the initial cross section of the portion of the draft member upon which it is seated, said strap being forced around the hollow draft member to inset the same and thereby form an indented seat for the strap, said blank having projecting ends which are brought together and secured to each other to secure the strap to the draft member; substantially as described.

In testimony whereof, I have hereunto set my hand.

DAVID M. SMITH.

Witnesses:
GEO. H. PARMELEE,
H. M. CORWIN.

Copies of this patent may be obtained for five cents each, by addressing the "Commissioner of Patents, Washington, D. C."